United States Patent
Farley et al.

(10) Patent No.: US 9,254,773 B2
(45) Date of Patent: Feb. 9, 2016

(54) ADAPTIVE RATE CONTROL FOR FEEDING GRAIN TO A GRAIN UNLOADER CONVEYOR

(75) Inventors: Herbert M. Farley, Elizabethtown, PA (US); Steven C. Young, Lancaster, PA (US); Kevin W. Ward, Lititz, PA (US); Edmund N. Holt, II, Denver, PA (US); Jeffrey D. Frego, Willow Street, PA (US); Bruce E. Anderson, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 1078 days.

(21) Appl. No.: 12/470,153

(22) Filed: May 21, 2009

(65) Prior Publication Data

US 2009/0290970 A1    Nov. 26, 2009

Related U.S. Application Data

(60) Provisional application No. 61/128,483, filed on May 22, 2008.

(51) Int. Cl.
*B60P 1/42* (2006.01)
*A01D 41/12* (2006.01)

(52) U.S. Cl.
CPC ............... *B60P 1/42* (2013.01); *A01D 41/1217* (2013.01)

(58) Field of Classification Search
CPC . A01D 41/1217; A01D 41/12; A01D 41/127; A01D 41/1271; A01D 41/1272; A01D 41/1273; A01D 41/1274; A01D 41/1275; A01D 41/1277; B60P 1/42

USPC .................. 222/14–22, 59, 63, 71, 227, 236; 414/812, 813, 526, 528
See application file for complete search history.

(56) References Cited

U.S. PATENT DOCUMENTS

| 2,883,076 | A | | 4/1959 | Palmer |
| RE24,920 | E | | 1/1961 | Palmer |
| 4,274,790 | A | | 6/1981 | Barker |
| 4,717,308 | A | | 1/1988 | Kuhns |
| 5,518,453 | A | | 5/1996 | Tribbett |
| 5,584,640 | A | | 12/1996 | Johnson |
| 5,733,094 | A | | 3/1998 | Bergkamp et al. |
| 5,806,441 | A | * | 9/1998 | Chung .......................... 110/185 |
| 6,042,326 | A | | 3/2000 | Thomas et al. |
| 6,073,428 | A | * | 6/2000 | Diekhans ................... 56/10.2 R |
| 6,119,442 | A | * | 9/2000 | Hale .......................... 56/10.2 H |

(Continued)

FOREIGN PATENT DOCUMENTS

| JP | 04325030 | 11/1992 |
| JP | 05146216 | 6/1993 |
| JP | 06030650 | 3/2008 |

*Primary Examiner* — Jason Boeckmann
(74) *Attorney, Agent, or Firm* — Patrick M. Sheldrake

(57) ABSTRACT

The control of an apparatus within a grain holding device for feeding grain to an unloader conveyor operable for conveying the grain from the holding device, includes sensing a predetermined condition or conditions representative of capacity of the unloader conveyor for receiving grain, and adaptively controlling the apparatus for feeding grain to the unloader conveyor in advantageous varying manners responsive to the conditions, including to delay initiation of feeding until the receiving capacity is increased, and to match the grain feed to the capacity. The automatic control can be overridden, to allow user control of unloader speed, and can be configured to allow cleanout of the unloader conveyor.

26 Claims, 9 Drawing Sheets

(56) References Cited

U.S. PATENT DOCUMENTS

| | | |
|---|---|---|
| 6,430,904 B1 * | 8/2002 | Coers et al. .................... 56/10.3 |
| 6,743,093 B1 | 6/2004 | Pope et al. |
| 6,776,569 B1 | 8/2004 | McMahon et al. |
| 7,040,980 B1 | 5/2006 | Kestel |
| 7,452,180 B2 * | 11/2008 | Talbi et al. .................... 414/812 |
| 2006/0104770 A1 | 5/2006 | Talbi et al. |

* cited by examiner

Operator  Start unload

Precondition: cross auger configured &
                            unloader off
                Trigger: unload sw closure
                Basic Flow: shall turn on unload auger, then
                            after a 1.5 second delay, turn on
                            cross auger (plus interlocks
                            on unload tube, etc.) to commence
                            op in adaptive control mode
                Annunciation: shall display same as today
                            (flash unload icon)

Exceptions:

1. If the unload auger fails to start or stops
                   without command, the operator shall detect
                   and manage manually.

2. If the cross auger fails to start or stops
                   without command, the operator shall detect
                   and manage manually.

Operator  Stop unload

Precondition: cross auger configured &
                            unloader is on (with cross
                            auger on or off)
                Trigger: unload sw closure
                Basic Flow: shall turn off unload auger &
                            cross auger
                Annunciation: shall display
                            (solid unload icon w/unload
                              tube extended)

Exceptions:

1. If unload auger fails to turn off, the
                   operator shall detect & manage manually.

2. If cross auger fails to turn off, the
                   operator shall detect & manage manually.

Fig. 7

Operator      Stop cross auger and leave unload auger on

Precondition:  cross auger configured &
                             unloader & cross auger are on
              Trigger:  simultaneously shift sw closure &
                        unload sw closure
              Basic Flow:  shall turn off cross auger
              Annunciation:  shall display
                             (flash unload icon)

Exceptions:

1. If cross auger fails to turn off, the
                 operator shall detect & manage manually.

2. If unload switch is closed before shift
                 switch is closed, the system shall follow
                 "Stop unload" case above.

Operator      Restart cross auger with unloader on

Precondition:  cross auger configured &
                             unloader is on & cross auger
                             is off
              Trigger:  simultaneously shift sw closure &
                        unload sw closure
              Basic Flow:  shall turn on cross auger
              Annunciation:  shall display
                             (flash unload icon)

Exceptions:

1. If cross auger fails to turn off, the
                 operator shall detect & manage manually.

2. What if unloader was not commanded on?
                 -not considered-.

3. If unload switch is closed before shift
                 switch is closed, the system shall follow
                 "Stop unload" case above.

Fig. 8

Operator  Unload tube stow while unloading

Precondition: cross auger and/or unload
           auger on
    Trigger: unload tube detected in cradle
    Basic Flow: the system shall follow "Stop
         unload" case above
    Annunciation: shall display
         (hide unload icon)

Exceptions:

Operator  Monitor cross auger performance

Precondition: cross auger configured &
           UDW selected
    Trigger:
    Basic Flow: cross auger motor pressure shall
        be displayed via UDW
    Annunciation: display PFC pump pressure
         numeric readout in operator
         selected psi or bar Exceptions:

1. Normal display for fault & lack of signal.

Fig. 9

ADAPTIVE RATE CONTROL FOR FEEDING GRAIN TO A GRAIN UNLOADER CONVEYOR

This application claims the benefit of U.S. Provisional Patent Application Ser. No. 61/128,483 filed May 22, 2008.

TECHNICAL FIELD

This invention relates generally to control of an apparatus within a grain holding device for feeding grain to an unloader conveyor operable for conveying the grain from the holding device, and more particularly, to sensing a predetermined condition or conditions representative of capacity of the unloader conveyor for receiving grain, and adaptively controlling the apparatus for feeding grain to the unloader conveyor in advantageous varying manners responsive to the conditions.

BACKGROUND OF THE INVENTION

U.S. Provisional Application No. 61/128,483, filed May 22, 2008, is incorporated herein in its entirety by reference.

Current grain holding systems, such as combine grain tank unloading systems of combine harvesters, typically consist of single or multiple apparatus, typically, a cross conveyor or conveyors, that feed grain to an unloader conveyor or conveyors, typically a vertical unloader conveyor including an unloader conveyor element, such as an auger, operable for lifting the grain to a generally horizontal conveyor or auger that conveys the grain to a truck or other holding bin. Currently, most cross, vertical and horizontal conveyors or augers start and shut off simultaneously. This simultaneous action causes several issues, namely, one can only operate the system at a maximum unload or discharge rate, and, in situations in which the system is halted in the loaded condition, start up torques of a loaded conveyor can be excessive and result in failure.

As a result, it would be desirable to have a capability to control the maximum unload rate of an unloader conveyor, for instance, to more accurately meter grain to top off trucks or other receptacles, and to fill smaller wagons and receptacles. Likewise, it would be desirable to have a capability to shut off the horizontal cross conveyor or augers to stop the feed of grain to the vertical unloader conveyor or auger in advance of shutdown. This would allow the vertical unloader conveyor or auger to empty before shutdown. A reason for this is that the vertical unloader auger is typically more inefficient and takes longer to empty than a horizontal auger. Another reason would be to eliminate the subsequent gross start up torque and power requirements, which, as noted above, can reduce the working life of components due to early failure, and can require higher product cost. In this latter regard, the system must be designed to handle the initial peak start up torque, which will typically last for just two seconds or so, and is significantly greater than normal operating torque.

Additionally, after use, if the unloader conveyor is not cleaned out, remaining grain has been observed to have a tendency to settle in the enclosed lower region of the vertical unloader conveyor around the lower end of the auger therein and the adjacent end of the cross conveyor adjacent to the inlet opening. As a result, an additional problem that can occur if the cross conveyor and unloader conveyor are started simultaneously, or the cross conveyor is started first, is that the cross conveyor can force or pack the grain into and against the grain in the lower unloader conveyor housing, thereby causing grinding, cracking of, and other damage to the grain.

Reference Talbi et al., U.S. Pat. No. 7,452,180, which discloses a grain tank unloader and clean out control, which, when an unload command is received, will automatically initiate operation of the unloader conveyor, then, after a delay, automatically initiate operation of the grain tank or cross conveyor for feeding grain into the inlet end of the unloader conveyor, to overcome some of the start up problems. And, during operation, when a cleanout command is received, the control will automatically cease operation of the grain tank conveyor, then, after a sufficient time period for the unloader conveyor to empty, automatically cease operation of the unloader conveyor. These are desirable features, but an initial or start up delay is not always required, and in some instances, can be more advantageously shortened, or lengthened. Additionally, no provision is provided for controlling operation for topping off and the like.

What is sought therefore, is a manner of controlling feeding of grain to an unloader conveyor of a grain holding device, which overcomes one or more of the problems, and provides one or more of the features, set forth above.

SUMMARY OF THE INVENTION

What is disclosed is a manner of controlling feeding of grain to an unloader conveyor of a grain holding device, which overcomes one or more of the problems, and provides one or more of the features, set forth above.

According to a preferred aspect of the invention, a method of adaptive rate control for feeding grain to an unloader conveyor, is disclosed. The grain holding device can be, for instance, a grain tank of a harvester such as a combine, and the unloader conveyor can include a housing having an inlet end including an opening for receiving grain, an opposite outlet end including a discharge opening through which the grain can be discharged. This can include a conventional grain tank unloader conveyor configuration including a vertical conveyor and a generally horizontal conveyor, or just one of either. The unloader conveyor has an unloader conveyor element, which can be for instance, a conventional helical auger or augers, extending through the housing between the ends and operable for conveying the grain through the housing from the inlet end and discharging the grain through the discharge opening. Apparatus is provided within the grain holding device, operable for feeding the grain therein at a controllable rate into the opening of the inlet end of the unloader conveyor for conveyance thereby from the grain holding device. This can include, for instance, one or more cross conveyors or grain tank conveyors. The control is configured and operable for automatically sensing at least one condition representative of a capacity of the unloader conveyor for receiving the grain; and automatically controllably operating the apparatus, e.g., cross conveyor or conveyors, in a variable manner for feeding the grain to the inlet end of the unloader conveyor at a rate which is a function of the sensed capacity of the unloader conveyor for receiving the grain.

According to a preferred embodiment of the invention, separate drives are provided for the unloader conveyor or conveyors, and the cross conveyor or conveyors or other apparatus for feeding the grain to the unloader conveyor. At least the drive for the cross conveyor or conveyors is preferably a fluid drive, such as a fluid motor or the like, but could alternatively comprise another suitable drive, such as a mechanical drive, electrical drive, or the like.

According to another preferred aspect of the invention, the automatic sensing of the at least one condition is done while momentarily initiating the operation of the apparatus, to determine an initial capacity of the unloader to receive the grain, and the step of automatically controllably operating the apparatus comprises subsequently operating the apparatus at a rate which is a function of the determined initial capacity. As an example, the sensed condition can be a pressure condition resulting from the initial momentary operation of the apparatus. This can be done simultaneous with initiation of operation of the unloader conveyor, or after a brief pause or delay to avoid high start up torque spiking. The sensed condition can also/alternatively comprise a speed of operation. And, if an alternative drive is employed, the sensed condition or conditions can include an electrical characteristic such as a current value in the instance of an electrical motor drive, or a strain condition or measured torque or force in the instance of a mechanical drive, to name just a few alternatives. In the instance wherein the sensed condition is a pressure, if the inlet region of the unloader conveyor contains a large quantity of grain, so as to have little or no capacity for receiving additional grain, and/or the apparatus itself contains substantial grain, the pressure condition will be high (speed will be low), as the grain being fed to the unloader will be at least momentarily forced against the grain in the inlet region. On the other hand, if the inlet region is empty, or is less than full, and/or the apparatus itself is less than full, the pressure condition will be lower (and the speed higher), thus representing available capacity, and the ability to receive grain. In the instance of an electrical drive, the current value will be greater for a higher torque condition, and in the instance of a mechanical drive, strain or measured torque will be greater. Thus, by sensing the condition or conditions at start up of the apparatus, namely high start up torque, possible grain damage, and the like, can be avoided.

According to another preferred aspect of the invention, the at least one condition can be sensed periodically, or continuously during operation of the unloader conveyor, to determine the grain receiving capacity, and the operation of the apparatus, particularly, the rate of feeding of the grain to the unloader conveyor, adapted or adjusted as a function of the capacity, on an ongoing, real time or near real time basis, in a feed back loop. As a result, the rate of grain feed to the unloader conveyor can be substantially matched to the capacity of the unloader to receive the grain, such that economy and efficiency of the unloading operation can be improved or maximized.

As still another preferred aspect of the invention, and operator input device can be provided in connection with the control, and configured to provide desirable operating features, including, but not limited to, the ability to override the initial start up routine, to allow simultaneous start up of both the apparatus for feeding the grain to the unloader conveyor, and the unloader conveyor. As another feature, the input device can be configured such that a cleanout routine wherein the operation of the apparatus is ceased prior to cessation of the operation of the unloader conveyor, or simultaneous cessation of operation of both, can be selected. Additionally, the input control can be configured to allow use by an operator to slow operation of the unloader conveyor, either alone or with the apparatus, to allow topping off more accurately and compacting the discharged grain flow, and other capabilities. The input device can be located in the vicinity of the grain holding device, e.g., in an operator cabin or platform of a combine, or at a remote location, such as in the operator cabin or platform of an accompanying vehicle such as a tractor or truck towing a grain receptacle such as a trailer or wagon, or a more remote location, such as a control center. Further, the input device can be conveniently located, such as on a multi-function or propulsion handle, and can comprise a single device such as a switch, button, or the like, which can be configured to be operable in different positions or states, or manipulated in different manners for inputting the respective commands, such as, held for a period of time, or momentarily, to initiate operation of the control in one mode or another, or actuated by a predetermined sequence of touches, and/or use of a shift key, to initiate the different modes. As another example, a multiple position switch could be provided in connection with the control, and operable in one position for initiating operation of the apparatus and unloader auger simultaneously; in another position for initiating operation of the apparatus after the unloader conveyor start; in another position which provides the above-described sensed start of the apparatus; in another mode that provides sequential cessation of operation of the apparatus and the unloader conveyor; and still another which provides manual override control of at least unload rate, to enable topping off and the like.

BRIEF DESCRIPTION OF THE DRAWINGS

FIG. 7 is a chart illustrating various operator selectable operating modes for the control of the invention, including start and stop unload;

FIG. 8 is another chart illustrating various other operator selectable modes, including cleanout and restart; and FIG. 9 is another chart illustrating various operator selectable modes, including unloader stow and performance monitoring.

DETAILED DESCRIPTION OF THE INVENTION

Figure 1:
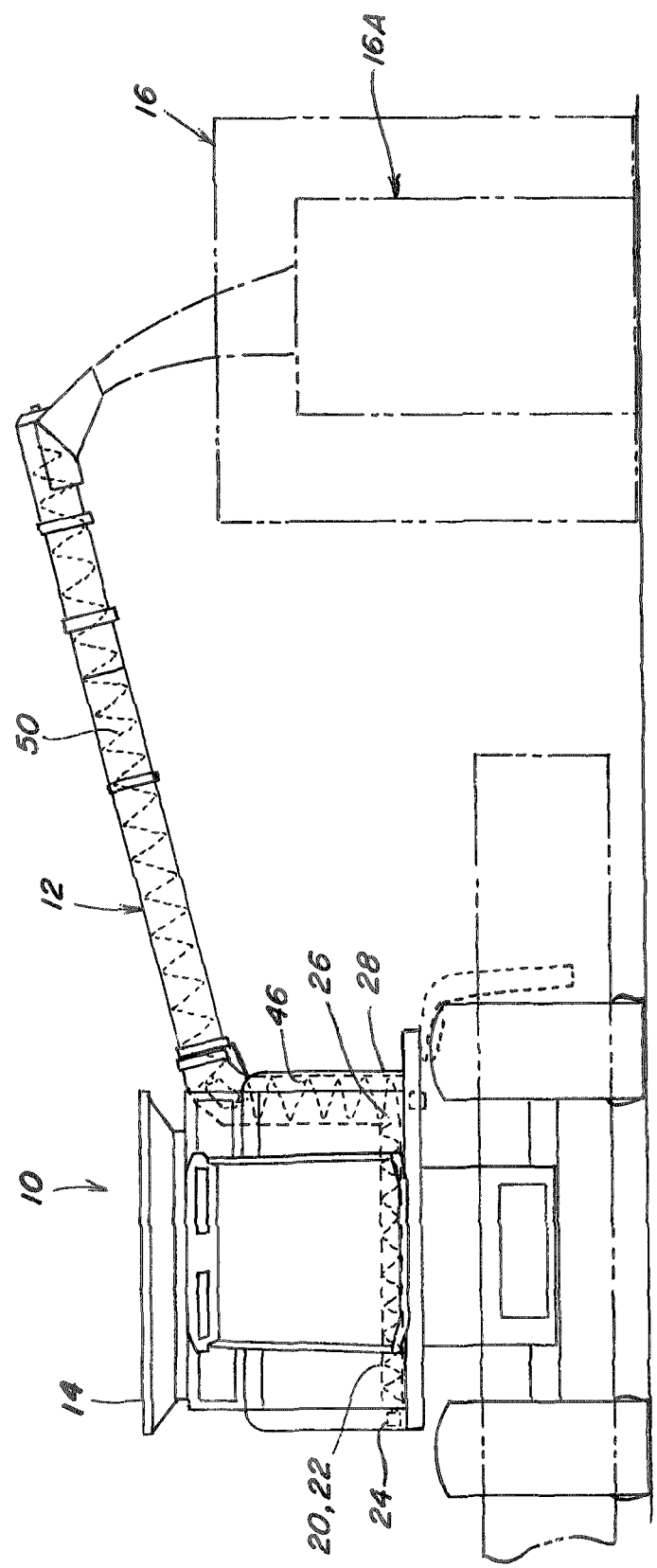
FIG. 1 is a simplified front view of a representative agricultural harvesting machine, including an unloader conveyor controllably operable according to the invention for unloading grain from a grain tank of the machine into an accompanying receptacle, also shown.

Referring now the drawings, in FIG. 1, a representative agricultural harvesting machine 10 is shown, including an unloader conveyor 12 operable for unloading grain from a grain holding device, which is a conventional grain tank 14, located on an upper region of harvesting machine 10. Here, harvesting machine 10 is depicted as a well known, commercially available combine operable for harvesting a wide variety of grains, including, but not limited to, wheat, beans, corn, rice, and the like. Typically, the grain is harvested and threshed from stalks, pods, or other crop material, and conveyed away from a cleaning system of machine 10 by a clean grain conveyor to a grain elevator (not shown). The grain elevator then lifts the grain upwardly to a grain delivery conveyor which is operable for discharging the grain into grain tank 14. When grain tank 14 is filled with grain, or filled to a desired level, unloader conveyor 12 can be operated for unloading the grain from tank 14, onto the ground, or into a wagon, truck or other vehicle, or a bin or other grain receptacle 16 (larger receptacle illustrated for example) or 16A (smaller receptacle).

Figure 2:
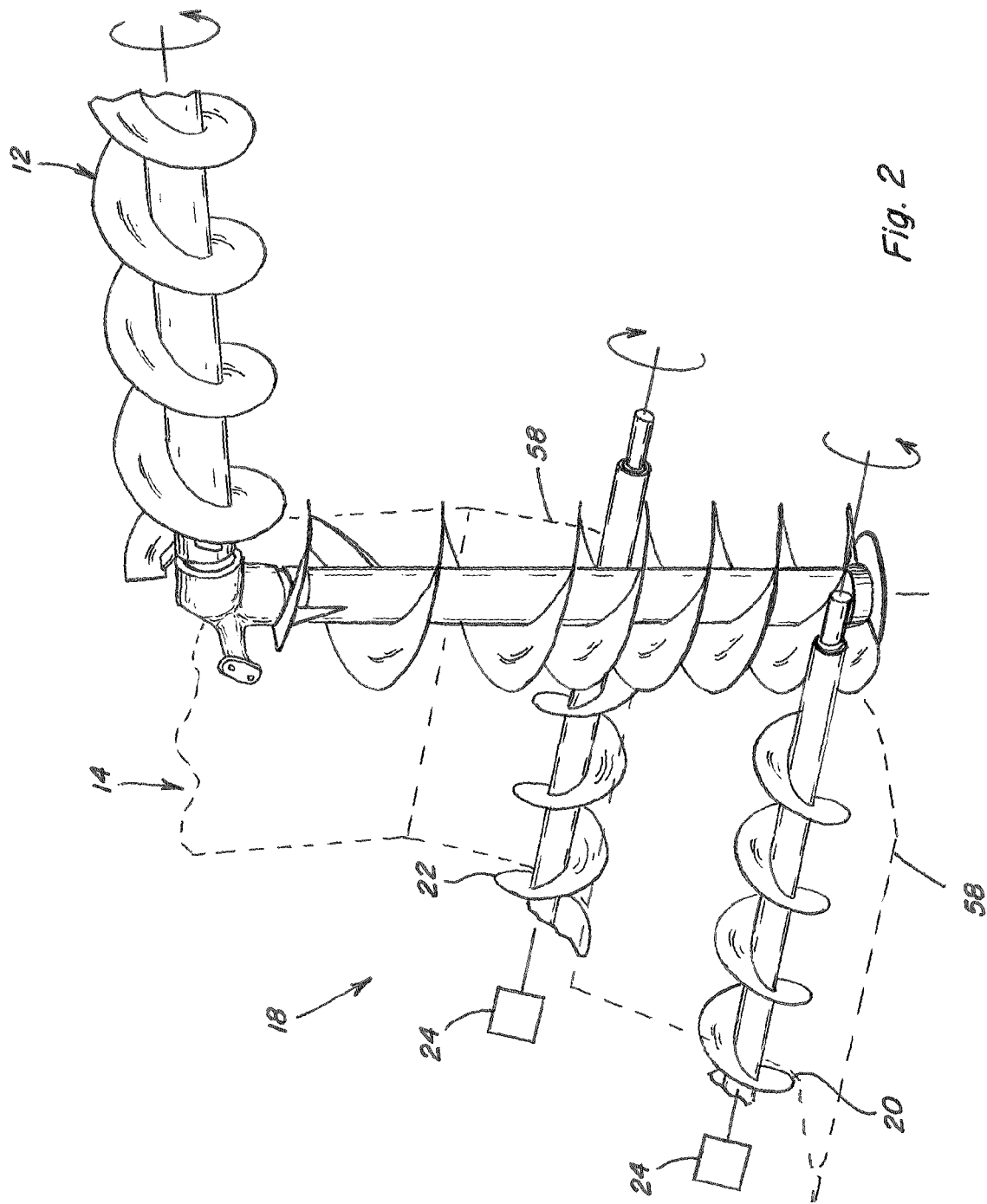
FIG. 2 is a simplified perspective view of aspects of the unloader conveyor of FIG. 1, in association with apparatus controllable according to the invention for feeding grain to the unloader conveyor.
Figure 3:
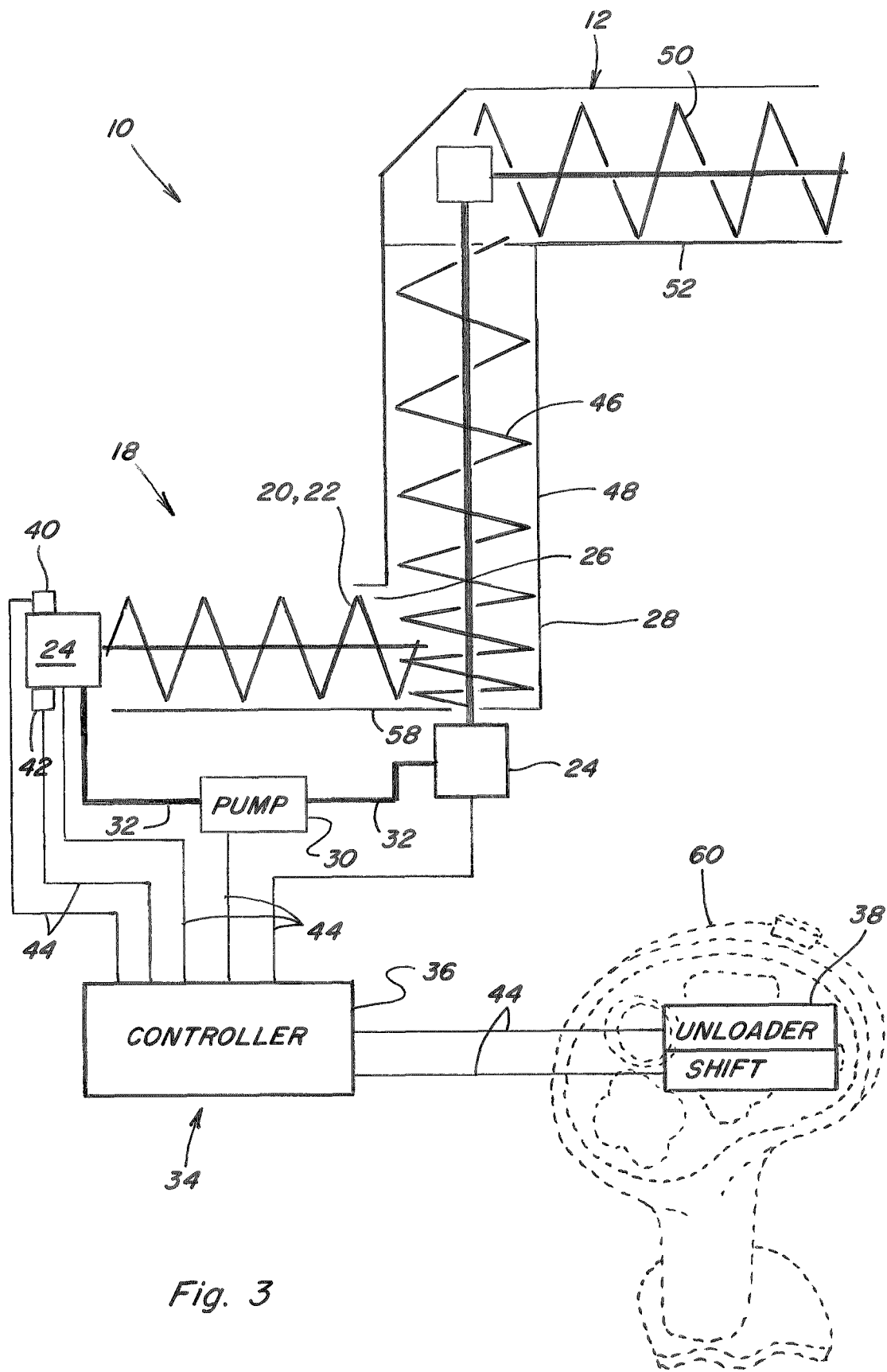
FIG. 3 is a simplified schematic representation of the unloader conveyor and associated apparatus of FIGS. 1 and 2, and additionally showing aspects of a control of the invention.

Referring also to FIGS. 2 and 3, grain tank 14 includes apparatus 18 operable for feeding or conveying the grain contained therein to unloader conveyor 12. Here, apparatus 18 includes a pair of conventional cross conveyors 20 and 22 disposed in sideward extending covered troughs 58 in a floor of the grain tank, in the well known manner. Cross conveyors 20 and 22 each comprises a generally horizontal elongate helical auger rotatable by a drive 24 as denoted by the arrows in FIG. 2, for conveying grain through the respective troughs 58 to an opening 26 in an inlet end 28 of unloader conveyor 12. Here also, it should be noted that although apparatus 18 in grain tank 14 is illustrated including two cross conveyors 20 and 22 for feeding grain to unloader conveyor 12, a variety of other conveyor configurations can be utilized for performing this function, including, but not limited to, a single conveyor, or more than two conveyors, such as two cross conveyors that feed to a main conveyor, which, in turn, feeds the unloader conveyor. Also, although helical augers are shown, apparatus 18 can comprise other type conveyors, such as a moving belt or belts, or any other apparatus suitable for feeding grain to the unloader conveyor. Covered troughs are used, and are advantageous to the present invention, as they limit the flow of grain from the grain tank into troughs 58, and the pressure that can be exerted against conveyors 20 and 22 by the grain thereabove within the tank.

Drives 24 of conveyors 20 and 22 preferably comprise fluid motors driven by pressurized fluid received from a pump 30 via fluid lines 32. Alternatively, drives 24 can be electric motor drives, or mechanical drives such as belt drives, chain drives, or the like. Here, it should be noted that it is preferred that conveyors 20 and 22 be driven separately from unloader conveyor 12, to provide advantages of the present invention. Referring particularly to FIG. 3, unloader conveyor 12 is driven by a drive 24 which can also be a fluid motor driven by pump 30, an electric motor drive, or a mechanical drive such as a belt drive, chain drive, or the like.

Drives 24 of and pump 30 comprise elements of a control 34 of the invention, operable for controlling unloader conveyor 12 and apparatus 18, as will be explained. Other elements of control 34 preferably include a processor based controller 36; an input device 38; and at least one sensor, preferably including a pressure sensor 40 and a speed sensor 42 in the instance of a fluid drive, or an electrical signal sensor such as a current sensor in the instance of an electrical drive, or a torque or strain gauge in the instance of a mechanical drive, to name a few alternatives, all connected to controller 36 via suitable conductive paths 44, which can be, for instance, wires of a wiring harness, or a wired or wireless communications network.

Unloader conveyor 12 here includes an elongate upwardly or generally vertically extending auger 46 supported for rotation in an upwardly extending tubular housing 48, and an elongate auger 50 oriented horizontally or at a small acute angle to horizontal, supported for rotation in an elongate tubular housing 52 connected to and forming a continuation of housing 48. Housing 52 and an upper portion of housing 48 are supported in cantilever relation by a lower portion of housing 48 for rotation relative thereto, between a sidewardly extending unloading position as shown in FIG. 1, and a rearwardly extending stowed position at about a 90 degree angle to the unloading position, in the well known manner. Auger 50 is connected to auger 46 for rotation thereby in a suitable manner, such as by bevel gears, a Hooke's joint, or the like, also in the well known manner, and auger 46 is driven by the drive 24 connected thereto.

Figure 4:
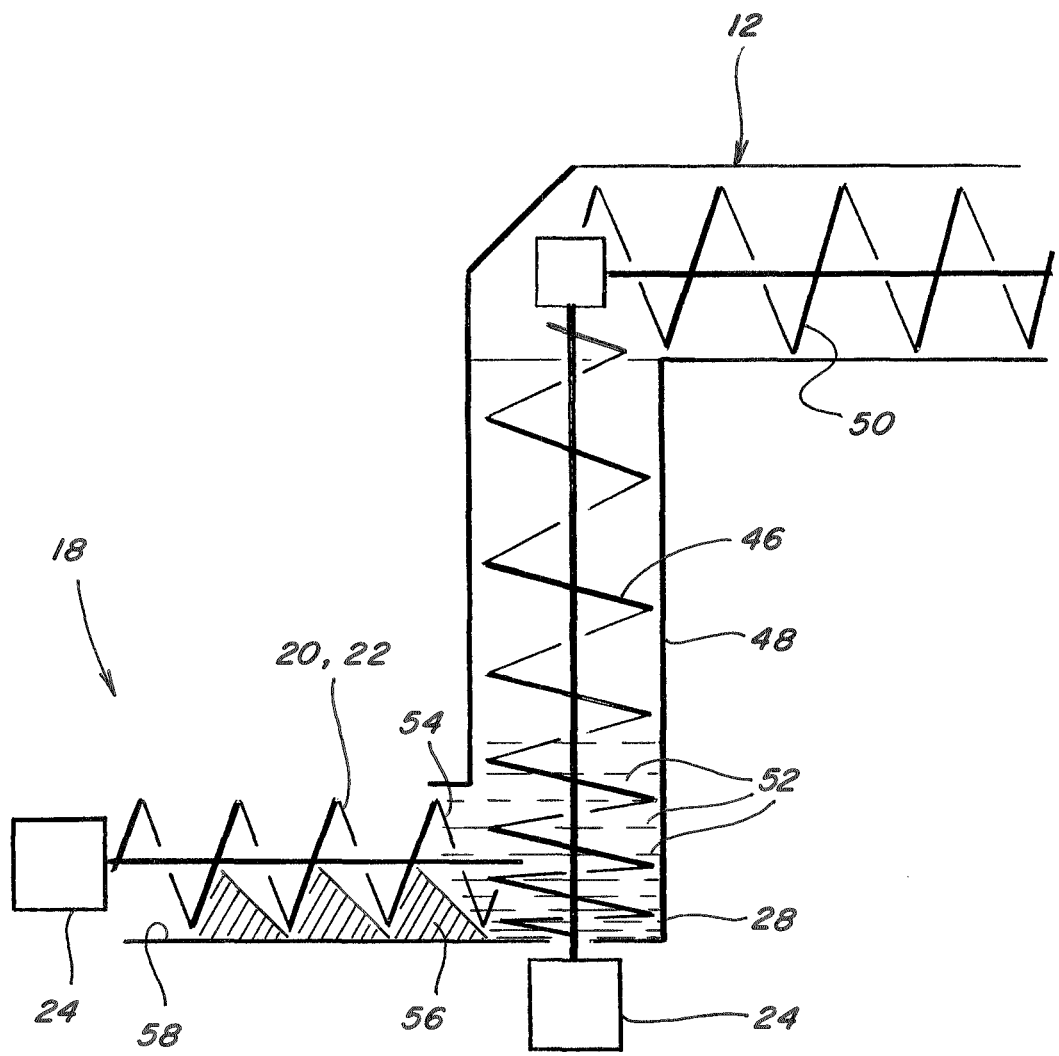
FIG. 4 is a simplified schematic representation of the unloader conveyor and associated apparatus, showing a representative start up grain unloading condition.
Figure 5:
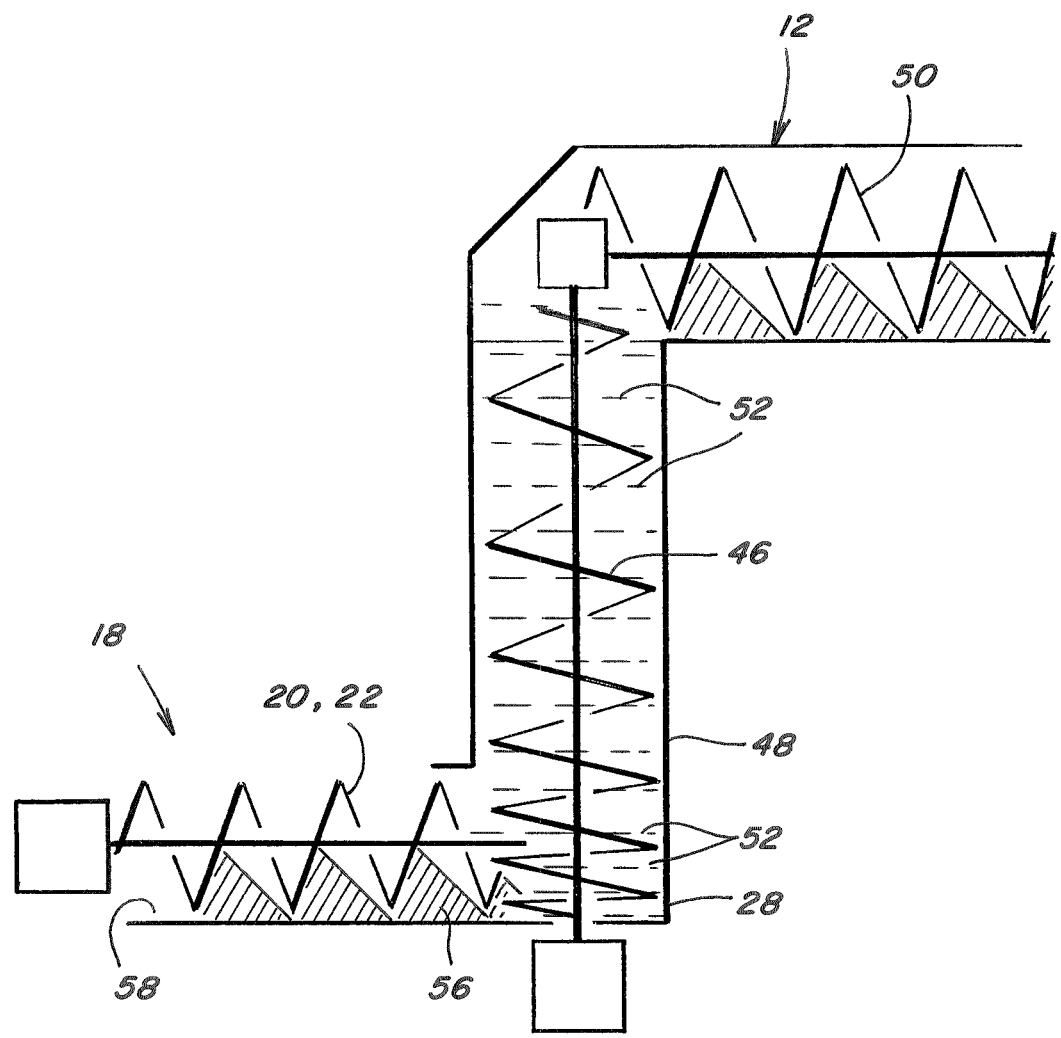
FIG. 5 is another simplified schematic representation of the unloader conveyor and associated apparatus of FIGS. 1 and 2, showing desired grain distribution therethrough during unloading.

Referring also to FIGS. 4 and 5, contrasting grain loading conditions within unloader conveyor 12, and thus the capacity thereof to receive grain, and of conveyors 20 and 22 of apparatus 18, are illustrated. Typically, as a general rule, grain remaining in unloader conveyor 12 after cessation of operation will have a tendency to collect or even pack in inlet end 28 of housing 48, denoted by numbers 52 and illustrated by the series of horizontal dashed lines 52 in FIG. 4. This grain 52, if in sufficient quantity, will tend to accumulate against the adjacent flight or flights 54 of the augers of conveyors 20 and 22, and any grain, denoted by number 56 located in troughs 58 containing conveyors 20 and 22. As a result, if conveyors 20 and 22 are started operated while this accumulated grain 52 is present, the grain 52 will resist or interfere with entry of the grain into inlet end 28. This will result in an increase in the torque needed to rotate conveyors 20 and 22, and can slow the speed of rotation of drives 24 thereof, so as to raise the fluid pressure condition therein if the drives are fluid drives, change the electrical current if an electrical drive, and if a mechanical drive, change the measured torque or strain. Thus, in the instance of the fluid drive, a high fluid pressure in drives 24, either alone, and in combination with slow rotational speed, has been found to represent a reduced capacity in inlet end 28 of unloading conveyor 12 to receive additional grain.

In contrast, as illustrated in FIG. 5, when operating, auger 46 will lift and distribute the grain along the height of housing 48, as denoted by numbers 52, to continuously create capacity within inlet end 28 for receiving grain 56 conveyed by conveyors 20 and 22, such that resistance to entry into inlet end 28 will be less, with a resultant lower torque demand, and lower fluid pressure in drives 24 and greater speed of rotation. In the instance of an electrical drive, the operating current would be different, and in the instance of a mechanical drive, the measured torque or strain would be different. Additionally, when grain tank 14 begins to empty, resulting in less grain in troughs 58, an even lower torque will be required.

Pressure sensor 40 and speed sensor 42 are illustrated in connection with drive 24 of one or both cross conveyors 20 and 22, and are operable for generating signals representative of fluid pressure and rotational speed, respectively, of the conveyor 20 and/or 22, and outputting those signals to controller 36. Generally, both higher fluid pressure and lower rotational speed will be representative of a higher torque load or resistance to rotation of conveyors 20 and 22, resulting from blockage or resistance to entry of grain into inlet end 28. This will be interpreted as less capacity of unloader conveyor 12 to receive grain as noted above. And, a lower fluid pressure and higher rotational speed of conveyors 20 and 22 will be representative of a lower torque load, less resistance, and thus interpreted as greater capacity. As special cases, at initiation of operation of conveyors 20 and 22, high pressure and little or no rotation of the conveyors will be representative of a packed inlet end, and low pressure and maximum rotational speed will be interpreted as an empty or near empty condition. Controller 36 uses this pressure and speed information according to the invention, to adaptively control the unloading operation, and may use additional information, e.g., engine speed, to facilitate this. Again, in the instance of another type of drive, e.g., electrical drive, mechanical drive, other sensed conditions, e.g., electrical current, strain measurement or torque measurement would be used.

Control 34 is configured to provide the ability to adaptively automatically drive conveyors 20 and 22 independent of unloader conveyor 12; and to allow operator or manual control, such that conveyors 20 and 22 can be timed to start, stop or vary speed independent of unloader conveyor 12, including so as to feed grain to the unloader conveyor 12 at rates less than the maximum unloading grain flow rate of the unloader conveyor. In this regard, a feature of the fluid system of control 34 is the ability to provide an un-commanded or adaptive control of start up torques while maximizing the average unload rate.

In one preferred manner of fluid based adaptive control, control 34 can be configured to start or initiate operation of conveyors 20 and 22 just after initiation of operation of unloader conveyor 12, to avoid a startup torque spike. A controlled fluid pressure is applied to start drives 24 of conveyors 20 and 22, and the drives are sized to have a defined peak or threshold torque set at a level so as to operate to convey grain only when unloader conveyor 12 has the ability or capacity to accept the grain. If there is a lack of capacity to receive grain, drives 24 of conveyors 20 and 22 will stay above the threshold and stall until unloader conveyor 12 evacuates some percentage of its charged or full condition so as to have the capacity for receiving grain. Then, at the moment conveyors 20 and 22 unstall (torque falls below the threshold), those conveyors will automatically begin to convey grain un-commanded.

Alternatively, controller 36 can be programmed to provide the adaptive start up control capability, as a function of inputs from sensors 40 and/or 42. In either instance, controller 36 of control 34 has the ability to automatically sense and adaptively react to available conveying capacity or space within unloader conveyor 12 as part of a closed loop feedback routine. This is more efficient than simply using a preconfigured delay, as essentially, any delay is automatically tailored/adapted to capacity, resulting in improved average unload time.

As another feature of control 34, it is configured to allow reverse operation of conveyors 20 and 22, which facilitates clean out of collected grain, including within inlet end 28 of the unloader conveyor 12 between or when changing crops, and in the event of mechanical failure of unloader conveyor 12.

Another feature is torque sense control wherein conveyors 20 and 22 run at a given speed during the grain tank unload cycle as normal, but when the grain tank is approaching empty, and a portion of conveyors 20 and/or 22 become exposed (no longer covered with grain) and the grain feeding into the trough or troughs is at a lesser capacity. This capacity reduction at the end of the unload cycle has been found to increase the time to completely evacuate the last 50 or so bushels from the grain tank. With the torque sensing capability of control 34, this condition is sensed via sensor or sensors 40, and/or sensor or sensors 42, which can be for instance, pressure and speed sensors, respectively, and/or other sensors as discussed above, and control 34 will automatically increase the speed of conveyors 20 and 22 when a threshold sensed value, e.g., pressure and/or speed value, is/are reached, so as to gather and feed the remaining grain to the unloader conveyor more quickly, to decrease the overall time of the unload cycle.

As another feature, control 34 is configured to provide a staged shut off capability, wherein operation of conveyors 20 and 22 is ceased prior to cessation of operation of unloader conveyor 12, such that unloader conveyor 12 can be completely emptied. This can be advantageous later, when unloader conveyor 12 is restarted, as start up torque requirements will be reduced.

As still additional features, control 34 is preferably configured to provide enhanced operator input interface capabilities. One feature in this regard is staged shut off operator interface control. This feature allows an operator to use input device 38 in one manner to select simultaneous shutdown of unloader conveyor 12 and conveyors 20 and 22, and in another manner to first cease or shut off conveyors 20 and 22, allowing unloader conveyor 12 to empty, and then to cease or shut off conveyor 12. As a preferred methodology of operation, a single operator operation of input device 38 would effect simultaneous shut off of conveyors 12, 20 and 22, and operation of input device 38 with a shift operation would effect shut off of conveyors 20 and 22 only. As a result, the operator is required to knowingly select the manner of operation, with awareness that in the second instance, the unloader conveyor is still operating and must be shut off when the unloading operation is complete.

Control 34 is also configured to allow varying the speed of operation of at least conveyors 20 and 22 utilizing input device 38, or another input device. This recognizes that there are instances when maximum unload rate is not desired, e.g., when topping off a grain receptacle, or unloading into a smaller receptacle e.g., receptacle 16A in FIG. 1, where unloading at a higher rate may cause spillage or the like. In this regard, the input device could be utilized to vary the unload rate until a desired rate is found. Here, controller 36 of control 34 and input device 38 can be configured, e.g., programmed, to control operation of conveyors 20 and 22 responsive to inputted commands via input device 38 in predetermined manners, e.g., multiple actuation and/or for varying lengths of time. To facilitate convenient and simple operation, input device 38 can be located on a multi-function or propulsion handle 60 (FIG. 3) or other location. As another option, input device 38 can be configured as a three position switch with a first position as off; a second position effecting operation of unloader conveyor 12 only; and a third position effecting simultaneous operation of unloader conveyor 12 and conveyors 20 and 22.

Control 34 can also be configured, e.g., programmed, to allow telematic control of the unloading operation from another vehicle, such as a vehicle containing or towing a receptacle into which the grain is being unloaded, e.g., a truck or tractor, or other remote location, such as a control center.

Figure 6:
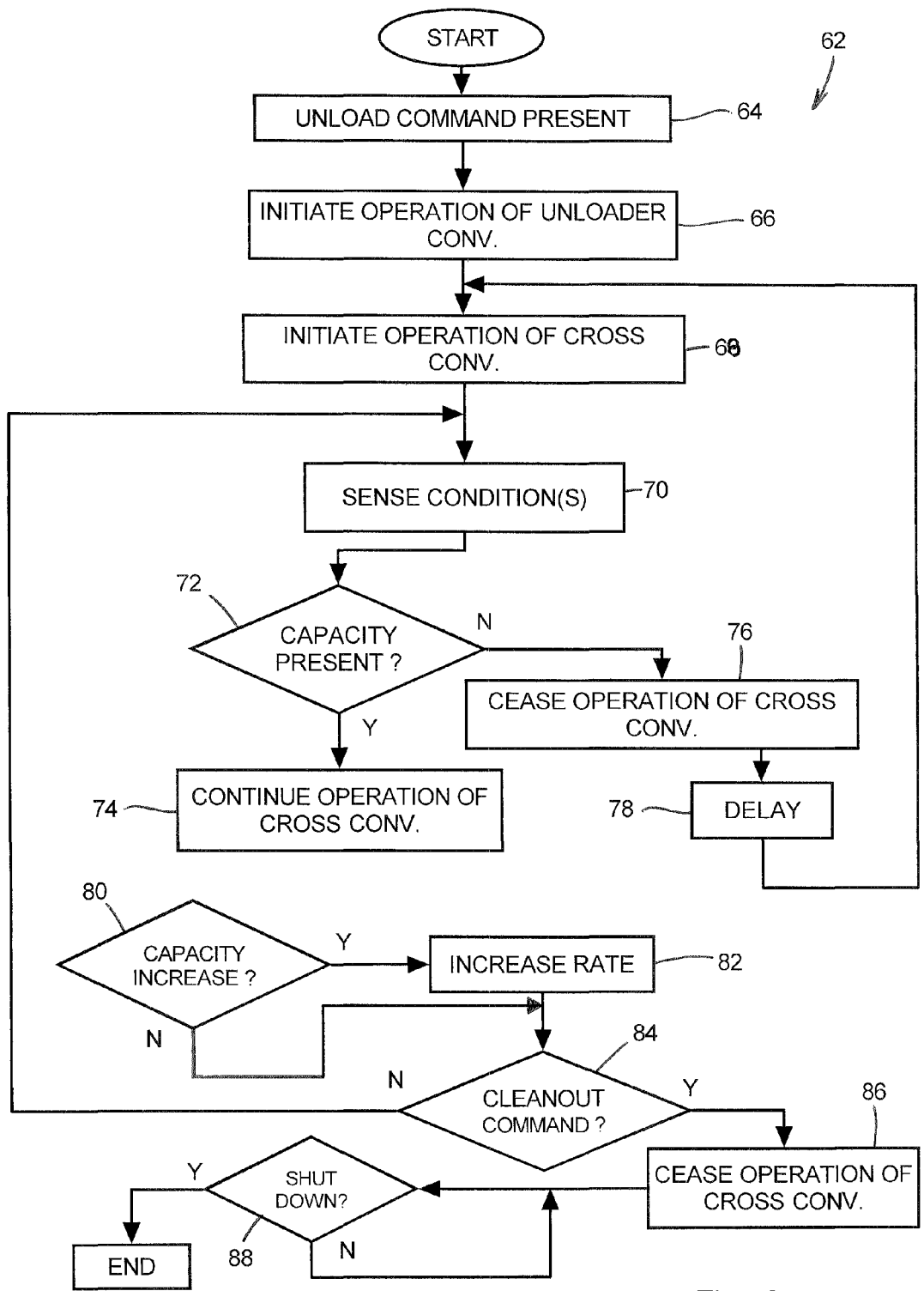
FIG. 6 is a flow diagram showing steps of a method of operation of the control of the invention.

Referring also to FIG. 6, an exemplary manner of adaptive operation of control 34 using the sensed condition or conditions, e.g., pressure and/or speed information from sensors 40 and 42 in the instance of the fluid driven system, electrical current in the instance of an electrical motor driven system, torque and/or strain for a mechanical system, to determine information representative of a torque loading condition exerted against drive or drives 24 of conveyors 20 and/or 22, is shown. As explained above, this information can be used to determine the amount of grain capacity within inlet end 28 of unloader conveyor 12, and then to adaptively respond, on an ongoing basis, in real time or near real time. Operation is initiated by an unload command, as denoted at block 64, which can be, for instance, a momentary operation of input device 38. Responsive to the unload command, controller 36 will initiate operation of unloader conveyor 12, as denoted at block 66, and then conveyors 20 and 22, as denoted at block 68. Controller 36 will monitor the signals of sensor or sensors 40 and/or 42, representative of a selected operating parameter or parameters representative of capacity of unloader conveyor 12, which here are fluid pressure and rotational speed of a conveyor or conveyors 20, 22, as denoted at block 70.

If grain receiving capacity is present, as determined at decision block 72, operation of conveyors 20 and 22 will automatically be continued, as denoted at block 74. On the other hand, if capacity is not present (pressure above a predetermined or threshold level or value, and/or speed below a predetermined or threshold value) operation of conveyors 20 and 22 will be ceased, as denoted at block 76. Here, it should be noted that the determination of capacity (decision block 72) can be made by controller 36 via software, or in the above-described manner via hardware configuration, e.g., stalling of drives 24 of conveyors 20 and 22 at threshold or peak pressure. In either instance, in the absence of capacity, delay of operation of conveyors 20 and 22 will occur, as denoted at block 78.

In the instance of a software determination of capacity, controller 36 will automatically implement a routine to reinitiate operation of conveyors 20 and 22 after some condition, e.g., a timed delay, and in the instance of a hardware implementation, drive or drives 24 of conveyors 20, 22 will automatically reinitiate operation after conditions, e.g., lack of capacity, blockage, causing stalling is/are alleviated (pressure or other sensed value falls below threshold).

In either of the above instances, going back to block 74, controller 36 via sensors 40, 42, and/or drives or drives 24 of conveyors 20, 22, can sense or determine presence of additional capacity of unloader conveyor 12, as denoted by decision block 80, such that the rate of operation of conveyors 20, 22 can be adaptively increased, as denoted at block 82, or if conditions indicate, decreased, and the method can proceed to decision block 84 to determined if a cleanout command is present, e.g., inputted via device 38. Alternatively, an empty condition can be automatically sensed, via sensed pressure and/or speed or other condition as explained above, and cleanout initiated automatically.

Returning to block 80, if no capacity increase is present, controller 36 can proceed to decision block 84 to determine if a cleanout command is present. At block 84, if no cleanout command is present, the controller can return to block 70 or another desired step in the process. If a cleanout command is present, a suitable clean out routine can be executed, such as cessation of operation of conveyors 20, 22 as explained above, as denoted at block 86. Then, unloader 12 will continue to operate until a shut down command is received via input device 38, or a predetermined time elapses, as denoted by decision block 88.

Here, it should be noted that the above method is intended to be exemplary of automatic adaptive operation of control 34, and thus is not intended to be limiting, and that a wide variety of alternative steps can be utilized for providing the features of the present invention.

Referring also to FIGS. 7, 8 and 9, manners of selection of various operating modes of control 34 are illustrated. In FIG. 7, when Start unload is selected, the unloader auger will be started, then after a delay to avoid a startup spike, the cross auger(s) will be started, and the adaptive control process automatically implemented. Also in FIG. 7, a Stop unload command for simultaneously ceasing operation of the cross and unloader augers is shown. In FIG. 8, commands for stopping the cross auger first for cleanout, and for restart, are shown. FIG. 9 shows commands for unloader stow, and performance display. These are exemplary of numerous commands that can be inputted via a single input device such as device 38.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of adaptive rate control for feeding grain to an unloader conveyor, comprising:
   providing a grain holding device;
   providing an unloader conveyor adjacent to the grain holding device, including a housing having an inlet end including an opening for receiving grain, an opposite outlet end including a discharge opening through which the grain can be discharged, an unloader conveyor element extending through the housing between the ends and operable for conveying the grain through the housing from the inlet end and discharging the grain through the discharge opening;
   providing apparatus within the grain holding device operable for feeding the grain therein at a controllable rate into the opening of the inlet end of the unloader conveyor for conveyance thereby from the grain holding device;
   automatically sensing at least one condition representative of a capacity of the unloader conveyor for receiving the grain wherein automatically sensing comprises determining information representative of a resistance to rotation or a torque loading condition exerted against a drive of the apparatus that conveys the grain through the housing from the inlet end;
   automatically controllably operating the apparatus in a variable manner as a function of the information representative of the resistance to rotation or the torque loading condition to automatically adapt a delay in feeding from the apparatus based on the resistance to rotation or the torque loading condition against the drive of the conveyer when feeding the grain to the inlet end of the unloader conveyor at a rate which is a function of the sensed capacity of the unloader conveyor for receiving the grain.

2. The method of claim 1, wherein the act of automatically sensing at least one condition comprises momentarily initiating the operation of the apparatus while sensing the at least one condition, to determine an initial capacity of the unloader to receive the grain, and the step of automatically controllably operating the apparatus comprises operating the apparatus at a rate which is a function of the determined initial capacity.

3. The method of claim 2, wherein subsequent to the initiation of the operation of the apparatus, the step of automatically sensing the at least one condition will be performed at least periodically and the rate adjusted responsive thereto.

4. The method of claim 1, wherein the grain holding device comprises a grain tank of an agricultural harvester, and the apparatus comprises at least one cross conveyor located within the grain tank.

5. The method of claim 4, wherein the apparatus comprises a fluid drive separate from a drive of the unloader conveyor element.

6. The method of claim 1, wherein the step of automatically operating the apparatus in the variable manner comprises increasing a speed of operation of the apparatus responsive to an increase in the capacity of the unloader conveyor for receiving the grain.

7. The method of claim 1, wherein determining information representative of a resistance to rotation or a torque loading condition comprises detecting a pressure condition exerted against the apparatus by the operation thereof in opposition to the grain within the unloader conveyor.

8. The method of claim 7, wherein the apparatus will be operated only when the pressure condition is less than a threshold value.

9. The method of claim 8, wherein the threshold value comprises a stall pressure of a drive of the apparatus.

10. The method of claim 8, wherein the operation of the apparatus is controlled by a controller and the threshold value is a stored value.

11. The method of claim 1 further comprising providing an input device operable for overriding the automatic operation of the apparatus the input device wherein the input device is configured to be at least one of usable for controlling the apparatus for feeding the grain to the unloader conveyor at a limited rate less than a maximum rate for feeding the grain to the unloader conveyor and operable by an operator to cease operation of the apparatus and then cease operation of the unloader conveyor element sufficiently thereafter for emptying substantially all of the grain from the unloader conveyor.

12. The method of claim 1 further comprising automatically ceasing operation of the apparatus prior to cessation of operation of the unloader conveyor element sufficiently for cleaning substantially all of the grain from the unloader conveyor.

13. A method of adaptive rate control for feeding grain to an unloader conveyor, comprising:
providing a grain holding device;
providing an unloader conveyor extending from the grain holding device, including a housing having an inlet end including an opening for receiving grain, an opposite outlet end including a discharge opening through which the grain can be discharged, an unloader conveyor element extending through the housing between the ends and operable for conveying the grain through the housing from the inlet end and discharging the grain through the discharge opening;
providing apparatus within the grain holding device controllably operable for feeding the grain within the grain holding device at a varying rate to the inlet end of the unloader conveyor for conveyance thereby from the grain holding device;
automatically sensing at least one condition representative of a capacity of the unloader conveyor for receiving the grain; and
automatically controllably operating the apparatus in a variable manner for feeding the grain to the inlet end of the unloader conveyor at a rate which is a function of the sensed capacity of the unloader conveyor for receiving the grain; and
providing an input device operable for overriding the automatic operation of the apparatus the input device wherein the input device is at least one of configured for controlling upon input the apparatus for feeding the grain to the unloader conveyor at a limited rate less than a maximum rate for feeding the grain to the unloader conveyor and configured to be operable by an operator to cease operation of the apparatus and then cease operation of the unloader conveyor element sufficiently thereafter for emptying substantially all of the grain from the unloader conveyor.

14. The method of claim 13, wherein the at least one condition representative of a capacity of the unloader conveyor for receiving the grain comprises a pressure condition.

15. The method of claim 13, wherein the input device is further configured to be operable by an operator to either perform the step of momentarily initiating the operation of the apparatus, or an alternative step of simultaneously initiating the sustained operation of the apparatus and the unloader conveyor element.

16. The method of claim 13, comprising a further step of automatically ceasing operation of the apparatus prior to cessation of operation of the unloader conveyor element sufficiently for cleaning substantially all of the grain from the unloader conveyor.

17. A method of adaptively controlling a rate of feeding grain to an unloader conveyor of an agricultural harvester, comprising:
providing a grain holding device on the harvester;
providing an unloader conveyor adjacent to the grain holding device, including a housing having an inlet end including an opening for receiving grain, an opposite outlet end including a discharge opening through which the grain can be discharged, an unloader conveyor element extending through the housing between the ends and operable for conveying the grain through the housing from the inlet end and discharging the grain through the discharge opening;
providing apparatus comprising at least one drive and at least one apparatus conveyer connected to the at least one drive within the grain holding device operable for controllably feeding the grain within the grain holding device to the inlet end of the unloader conveyor for conveyance thereby from the grain holding device;
determining using at least one sensor information representative of a resistance to rotation or a torque loading condition exerted against at least one drive of at the at least one apparatus conveyer that conveys the grain through the housing from the inlet end;
automatically controlling the operation of the at least one drive of the apparatus to feed the grain to the inlet while sensing at least one condition representative of a capacity of the unloader conveyor to receive the grain, such that the rate of the feeding of the grain to the inlet will be about equal to or less than the capacity of the unloader conveyor to receive the grain, wherein at least one drive is automatically controlled and a delay in feeding grain is automatically adapted based of the sensed information representative of the resistance to rotation or the torque loading condition
automatically sensing at least one condition representative of a capacity of the unloader conveyor for receiving the grain wherein automatically sensing comprises determining information representative of a resistance to rotation or a torque loading condition exerted against a drive of the apparatus that conveys the grain through the housing from the inlet end;
automatically controllably operating the apparatus in a variable manner as a function of the information representative of the resistance to rotation or the torque loading condition to automatically adapt a delay in feeding from the apparatus based on the resistance to rotation or the torque loading condition against the drive of the conveyer when feeding the grain to the inlet end of the unloader conveyor at a rate which is a function of the sensed capacity of the unloader conveyor for receiving the grain.

18. The method of claim 17, further comprising a step of providing an input device configured to control the operation of the apparatus and the unloader conveyor element, the input device being configured to be operable by an operator to either perform the step of momentarily initiating the operation of the apparatus, or an alternative step of simultaneously initiating the sustained operation of the apparatus and the unloader conveyor element.

19. The method of claim 18, wherein the input device is configured to be operable by an operator to controllably operate at least the unloader conveyor element at a reduced speed.

20. The method of claim 16, further comprising a step of providing an input device configured to control the operation of the apparatus and the unloader conveyor element, the input device being configured to be operable by an operator to about simultaneously cease operation of the apparatus and the unloader conveyor element, or to cease operation of the apparatus and then cease operation of the unloader conveyor element sufficiently thereafter for emptying substantially all of the grain from the unloader conveyor.

21. The method of claim 16, wherein the step of automatically controlling the operation of the apparatus comprises momentarily initiating the operation of the apparatus while sensing the at least one condition, to determine an initial capacity of the unloader to receive the grain, and only further operating the apparatus if the determined initial capacity is greater than a predetermined value.

22. The method of claim 21, wherein subsequent to the initiation of the operation of the apparatus, the step of automatically sensing the at least one condition will be performed at least periodically and the rate adjusted responsive thereto.

23. The method of claim 16, wherein the apparatus comprises a cross conveyor.

24. The method of claim 18, wherein the at least one condition comprises a pressure condition.

25. The method of claim 18, wherein the at least one condition comprises an operating speed of the apparatus.

26. The method of claim 18, comprising a further step of automatically ceasing operation of the apparatus prior to cessation of operation of the unloader conveyor element sufficiently for cleaning substantially all of the grain from the unloader conveyor.

\* \* \* \* \*